(12) United States Patent
Man

(10) Patent No.: US 10,216,817 B2
(45) Date of Patent: *Feb. 26, 2019

(54) CREATING XML DATA FROM A DATABASE

(71) Applicant: International Business Machines Corporation, Armonk, NY (US)

(72) Inventor: Kwai Hing Man, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 395 days.

This patent is subject to a terminal disclaimer.

(21) Appl. No.: 15/008,481

(22) Filed: Jan. 28, 2016

(65) Prior Publication Data

US 2016/0267196 A1   Sep. 15, 2016

Related U.S. Application Data

(63) Continuation of application No. 14/644,252, filed on Mar. 11, 2015.

(51) Int. Cl.
*G06F 17/00* (2006.01)
*G06F 17/30* (2006.01)
*G06F 17/22* (2006.01)
*G06F 17/24* (2006.01)
*G06F 17/27* (2006.01)

(52) U.S. Cl.
CPC .... *G06F 17/30569* (2013.01); *G06F 17/2247* (2013.01); *G06F 17/30923* (2013.01); *G06F 17/2223* (2013.01); *G06F 17/24* (2013.01); *G06F 17/2705* (2013.01); *G06F 17/30911* (2013.01)

(58) Field of Classification Search
CPC .. G06F 17/24; G06F 17/2247; G06F 17/2705; G06F 17/30923; G06F 17/30911
See application file for complete search history.

(56) References Cited

U.S. PATENT DOCUMENTS

| | | | |
|---|---|---|---|
| 6,421,656 B1 | 7/2002 | Cheng et al. | |
| 6,535,970 B1 | 3/2003 | Bills et al. | |
| 6,636,845 B2 * | 10/2003 | Chau | G06F 17/30917 |
| 6,853,992 B2 | 2/2005 | Igata | |
| 7,281,206 B2 | 10/2007 | Schnelle et al. | |
| 7,322,022 B2 | 1/2008 | Al-Azzawe et al. | |
| 7,836,098 B2 | 11/2010 | Baby et al. | |

(Continued)

OTHER PUBLICATIONS

"Generating XML Data from the Database", XML DB Developer's Guide, Oracle Help Center, included in Main Idea of Disclosure dated Oct. 14, 2013, <http://docs.oracle.com/cd/E11882_01/appdev.112/e23094/xdb13gen.htm#CHDBDAGE>.

(Continued)

*Primary Examiner* — Cesar B Paula
*Assistant Examiner* — David Faber
(74) *Attorney, Agent, or Firm* — Stephen R. Yoder

(57) ABSTRACT

A method is provided to generate a correct XML (eXtensible Markup Language) representation of source data from a relational database without knowing the format of source data. A XML parsing function is used to create the final XML data if the source data contains entity references. Where the source data does not contain entity reference, a XML publishing function is called to generate the final correct XML data.

3 Claims, 3 Drawing Sheets

250

(56) References Cited

U.S. PATENT DOCUMENTS

| | | | |
|---|---|---|---|
| 7,870,124 | B2 | 1/2011 | Liu et al. |
| 7,885,980 | B2 | 2/2011 | Tarachandani et al. |
| 7,917,515 | B1 | 3/2011 | Lemoine |
| 7,991,709 | B2 * | 8/2011 | Dejean .................. G06F 17/211 706/12 |
| 8,024,329 | B1 | 9/2011 | Rennison |
| 8,090,731 | B2 | 1/2012 | Sthanikam et al. |
| 8,255,394 | B2 | 8/2012 | Branigan et al. |
| 8,447,785 | B2 * | 5/2013 | Liu .................. G06F 17/30929 707/796 |
| 9,940,351 | B2 | 4/2018 | Man |
| 2002/0065822 | A1 | 5/2002 | Itani |
| 2002/0116371 | A1 | 8/2002 | Dodds et al. |
| 2002/0147748 | A1 | 10/2002 | Huang et al. |
| 2003/0014397 | A1 | 1/2003 | Chau et al. |
| 2003/0035000 | A1 | 2/2003 | Licon et al. |
| 2003/0088558 | A1 | 5/2003 | Zaharioudakis et al. |
| 2003/0120671 | A1 | 6/2003 | Kim et al. |
| 2003/0158854 | A1 * | 8/2003 | Yoshida ............ G06F 17/30569 |
| 2003/0182268 | A1 | 9/2003 | Lai |
| 2004/0060007 | A1 | 3/2004 | Gottlob et al. |
| 2004/0210573 | A1 | 10/2004 | Abe et al. |
| 2004/0268235 | A1 * | 12/2004 | Wason .................... G06F 17/24 715/205 |
| 2005/0091188 | A1 | 4/2005 | Pal et al. |
| 2005/0091588 | A1 * | 4/2005 | Ramarao ........... G06F 17/30569 715/248 |
| 2005/0165724 | A1 | 7/2005 | West |
| 2005/0228818 | A1 | 10/2005 | Murthy et al. |
| 2005/0228828 | A1 | 10/2005 | Chandrasekar et al. |
| 2005/0229158 | A1 | 10/2005 | Thusoo et al. |
| 2005/0278368 | A1 | 12/2005 | Benedikt et al. |
| 2005/0289175 | A1 | 12/2005 | Krishnaprasad et al. |
| 2006/0047646 | A1 | 3/2006 | Maluf et al. |
| 2006/0167928 | A1 | 7/2006 | Chakraborty et al. |
| 2006/0212420 | A1 | 9/2006 | Murthy |
| 2006/0242574 | A1 | 10/2006 | Richardson et al. |
| 2007/0016604 | A1 | 1/2007 | Murthy et al. |
| 2007/0016605 | A1 | 1/2007 | Murthy et al. |
| 2007/0174309 | A1 | 7/2007 | Pettovello |
| 2007/0198479 | A1 | 8/2007 | Cai et al. |
| 2007/0234199 | A1 | 10/2007 | Astigeyevich |
| 2007/0240035 | A1 | 10/2007 | Sthanikam et al. |
| 2007/0255748 | A1 | 11/2007 | Ferragina et al. |
| 2007/0271243 | A1 | 11/2007 | Fan et al. |
| 2007/0299811 | A1 | 12/2007 | Chandrasekar et al. |
| 2008/0028296 | A1 | 1/2008 | Aharoni |
| 2008/0059417 | A1 | 3/2008 | Yamada et al. |
| 2008/0098020 | A1 | 4/2008 | Gupta et al. |
| 2008/0114725 | A1 | 5/2008 | Indeck et al. |
| 2008/0215527 | A1 | 9/2008 | Charlet et al. |
| 2008/0301129 | A1 | 12/2008 | Milward et al. |
| 2009/0089263 | A1 | 4/2009 | McHugh et al. |
| 2009/0192956 | A1 * | 7/2009 | Dejean .................. G06F 17/211 706/12 |
| 2009/0265339 | A1 | 10/2009 | Chen et al. |
| 2009/0288026 | A1 | 11/2009 | Barabas et al. |
| 2010/0169354 | A1 | 7/2010 | Baby et al. |
| 2010/0185683 | A1 | 7/2010 | Baby et al. |
| 2010/0228781 | A1 | 9/2010 | Fowler et al. |
| 2010/0332966 | A1 | 12/2010 | Idicula et al. |
| 2011/0106811 | A1 | 5/2011 | Novoselsky et al. |
| 2011/0179085 | A1 | 7/2011 | Hammerschmidt et al. |
| 2011/0208730 | A1 | 8/2011 | Jiang et al. |
| 2011/0302189 | A1 * | 12/2011 | Liu .................. G06F 17/30929 707/769 |
| 2013/0290829 | A1 * | 10/2013 | Peng .................. G06F 17/2247 715/234 |

OTHER PUBLICATIONS

Man, Kwai Hing, "Creating XML Data From a Database", U.S. Appl. No. 14/644,252, filed Mar. 11, 2015, pp. 1-25.

* cited by examiner

CREATING XML DATA FROM A DATABASE

FIELD OF THE INVENTION

The present invention relates generally to—databases, and more particularly to creating XML data from a database.

BACKGROUND OF THE INVENTION

XML (eXtensible Markup Language) is a universal data format for publishing, storing, and sharing structured documents. XML can be used to exchange data between computers since it has a standard format that is consistent over different forms of hardware and operating systems. Marked-up text can be classified by XML node type, such as "document," "element," "attribute," or "text," among others. In an XML document, the logical constructs known as character data and attribute values consist of sequences, or strings, of characters, in which each character can either manifest directly (representing itself), or be represented by a series of characters called a character reference, of which there are two types: (i) a numeric character reference; and (ii) a character entity reference.

Structured Query Language (SQL) is used to communicate with a database. According to ANSI (American National Standards Institute), SQL is the standard language for relational database management systems. SQL statements are used to perform tasks such as update data on a database, or retrieve data from a database.

SQL/XML is an extension of the SQL language standard that includes XML publishing functions for converting relational data into XML. These publishing functions make it easy to publish database data in an XML document by creating tagged XML documents, for example, in character large objects. A SELECT statement can be used to assemble the required XML nodes, and capture the marked-up text, rather than having to write a program to generate the required XML. An INSERT statement can be used as well to write the generated text to a table.

SUMMARY

In one aspect of the present invention, a method for converting a first character string in a database element to an XML format, the method includes: determining an absence of an entity reference format for the first character string, the absence being indicated by failure of a XML parsing function parsing the first character string; determining a new entity reference format for the first character string; and creating a second character string in XML format from the first character string by adding the new entity reference format; wherein: the second character string is created using an XML publishing function for escaping the first character string; the step of determining an absence of an entity reference format for the first character string further includes creating a final XML format for the first character string by converting and concatenating the first character string in responsive to being successful of the XML parsing function parsing the first character string; and the steps of determining an absence of an entity reference format for the first character string and determining a new entity reference format for the first character string are performed automatically without human intervention.

DETAILED DESCRIPTION

Figure 1:
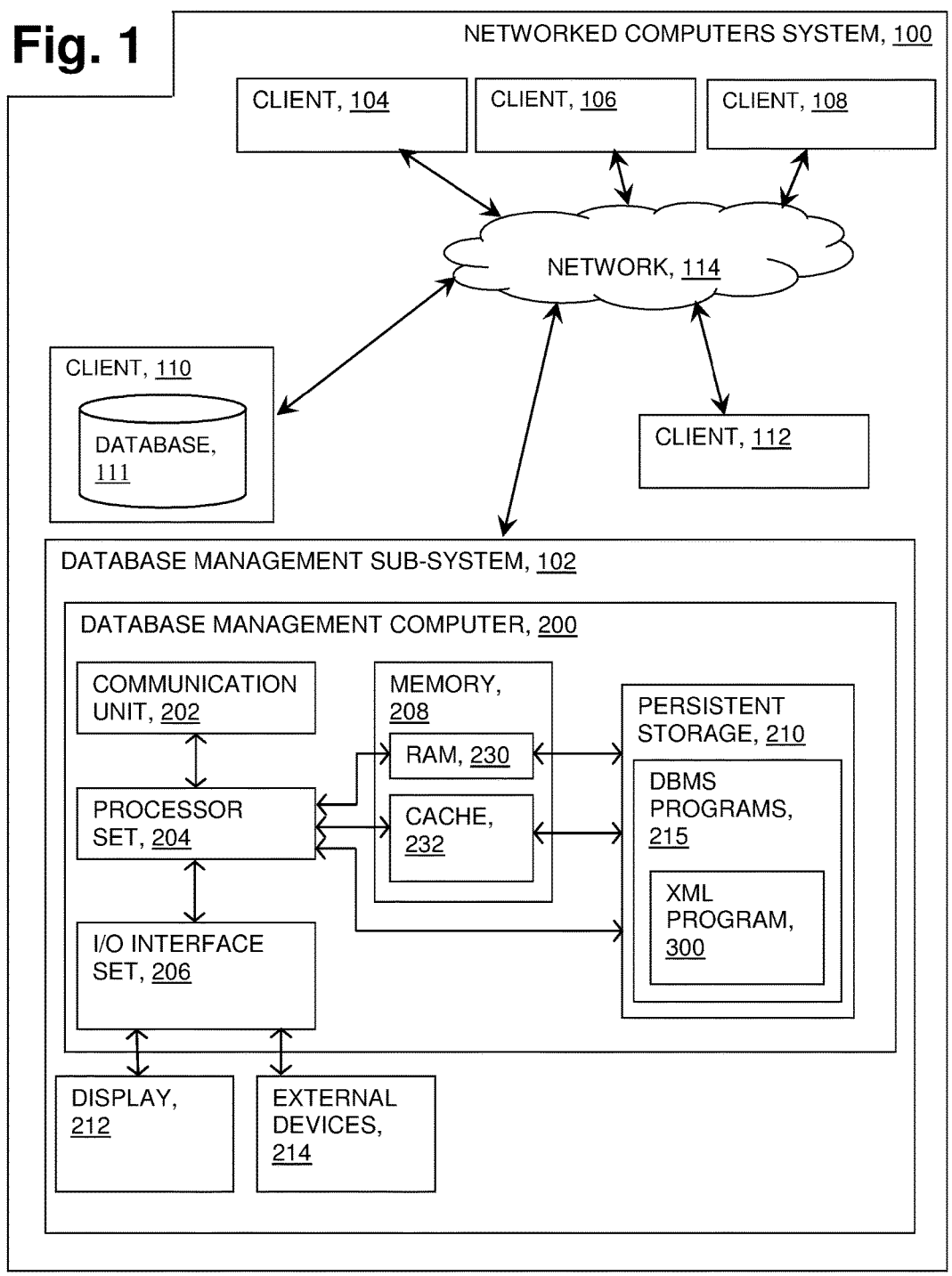
FIG. 1 is a schematic view of a first embodiment of a system according to the present invention.

XML (eXtensible Markup Language) publishing functions in a relational database system are enhanced to improve database applications that manipulate XML data. A user does not need to know anything about the format (e.g., entity reference or not) of source data in a database to create correct XML data. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: database management (DBM) sub-system 102; client sub-systems 104, 106, 108, 110, 112; database 111; communication network 114; database management computer 200; communication unit 202; processor set 204; input/output (I/O) interface set 206; memory device 208; persistent storage device 210; display device 212; external device set 214; database management system (DBMS) programs 215; random access memory (RAM) devices 230; cache memory device 232; and XML program 300.

While DBM sub-system 102 includes DBMS programs 215, the DBM sub-system is, in many respects, representative of the various computer sub-system(s) in the present invention. Accordingly, several portions of sub-system 102 will now be discussed in the following paragraphs. Many examples in this specification present the operation of DBM sub-system 102 as if it were a DB2 database management system in a zOS environment. These are illustrative examples only, and may essentially be practiced on any conventional database management system. (Note: the term(s) "DB2" and "zOS" may be subject to trademark rights in various jurisdictions throughout the world and are used here only in reference to the products or services properly denominated by the marks to the extent that such trademark rights may exist.)

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. XML program 300 is a collection of machine readable instructions and/or data that is used to create, manage and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

XML program 300 is stored in persistent storage 210 for access and/or execution by one or more of the respective computer processors 204, usually through one or more memories of memory 208. The XML program is located within DBMS programs 215, where other programs (not shown) carry out various functions of database management. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communication unit 202, in these examples, provides for communications with other data processing systems or devices external to sub-system 102. In these examples, communication unit 202 includes one or more network interface cards. Communication unit 202 may provide communications through the use of either, or both, physical and wireless communications links. Any software modules discussed herein may be downloaded to a persistent storage device (such as persistent storage device 210) through a communication unit (such as communication unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Database 111 is an organized collection of data. The data is typically organized to model aspects of reality in a way that supports processes requiring information. For example, modelling the availability of rooms in hotels in a way that supports finding a hotel with vacancies.

XML program 300 operates to create correct XML documents from, for example, a VARCHAR (Variable Character) column in a database without knowing the source data format (e.g., entity reference or not). Program 300 takes text from a VARCHAR or CLOB (Character Large Object) field and converts it into XML while sensing whether the text is already properly formatted using "entity reference" format. A user need not be aware whether the contents of the text are already formatted that way, and each tuple need not be the same in this regard. That is, a first tuple in the structured database may be formatted for an XML document, while a second tuple in the same structured database may not be so formatted, or the format may be unknown.

Some embodiments of the present invention recognize the following facts, potential problems and/or potential areas for improvement with respect to the current state of the art: (i) some rows in a VARCHAR column are in entity reference format (e.g. &), but some rows contain the actual values (e.g. &); (ii) XML publishing functions are used to create XML data from such columns (e.g., VARCHAR), by default, certain characters will be replaced by entity references; (iii) problems can be created when the source data is already in entity reference format; and/or (iv) problems can be created when a user has no idea which rows contain the data that is already in entity reference format.

A VARCHAR is a data type of a field (or column) in a database management system which can hold letters and numbers. A CLOB is a collection of character data in a database management system, usually stored in a separate location that is referenced in a table itself. When XML publishing functions are used to create XML data from a VARCHAR or CLOB column, by default, certain characters are replaced by entity references.

An entity reference is a group of characters used in text as a substitute for a single specific character that is also a markup delimiter in XML. Using the entity reference prevents a literal character from being mistaken for a markup delimiter. For example, if an attribute must contain a left angle bracket (<), the entity reference "<" may be substituted for the left angle bracket. A numeric or hexadecimal reference may also be substituted in that way. Entity references always begin with an ampersand (&) and end with a semicolon (;). Some entities predefined in XML are identified in Table 1, below.

TABLE 1

| Entity references predefined in XML. | |
| --- | --- |
| Character | Entity Reference |
| & | & |
| < | < |
| > | > |
| " | " |
| ' | ' |

When a database administrator (DBA) needs to create XML documents from a VARCHAR or CLOB column. Some rows in the VARCHAR/CLOB column are in entity reference format (e.g., &), but some rows contain the actual values (e.g., &), for example as shown in Table 2, below:

TABLE 2

Example of rows in different data format in a VARCHAR column.

| Row Number | VARCHAR |
|---|---|
| 1 | AB&C™ |
| 2 | AB&C ™ |

In table 2, row number 1 is in entity reference (AB&C™), while row number 2 is an actual value (AB&C™) corresponding to the entity reference in the row number 1.

The varied entry formats may be a result of the different ways in which the VARCHAR/CLOB column is populated in the database. For example, there may have been lots of rows that were populated by different applications. Consider the following exemplary codes for populating the rows in different ways in a VARCHAR column:

```
CREATE TABLE table1(ID int, company varCHAR(16)) ccsid unicode;
insert into table1 values(1, 'AB&C™');
insert into table1
   select
      2,
      x.company
         from XMLTABLE('/company' passing XMLPARSE(DOCUMENT
'<company>AB&C™</company>')
      columns
            company VARCHAR(16) path '.'
         ) as x
-- Note in UTF-8 (e2, 84, a2) ™. name: TRADE MARK SIGN.
select id, company, hex(company) as company_hex from table1;
ID      COMPANY       COMPANY_HEX
1       AB&C™    414226616D703B432623383438323B
2       AB&C ™             41422643E284A2
   2 record(s) selected
```

In the above exemplary code, the first row (ID 1) in the VARCHAR column in a database table is populated directly in an entity reference format (AB&C™), whereas the second row (ID 2) in the VARCHAR column in the database table is populated by a XML function (i.e., XMLPARSE) from a XML table (i.e., using XMLTABLE function) that leads to an actual value (AB&C™). If we don't have the original source data, there is no way to re-populate the column again once a VARCHAR column is populated.

When XML publishing functions are used to create XML data from a source data already in entity reference format, a problem arises in XML publishing functions, which by default, escape the data. A "double" escape occurs if the source is already in an entity reference format. For example, when a XML publishing function XMLELEMENT is used to create XML data from a source (e.g., ID 1 in the previous exemplary code) already in an entity reference format (SQL simplified for an illustrative purpose):

SELECT XMLELEMENT (NAME "NEWcompany", company) FROM table1 where id=1

This produces a bad XML data (although still valid according to W3C (World Wide Web Consortium) standard, it is not what a user wants):

<NEWcompany>AB&amp;C&#8482;</NEWcompany>

If viewed by a web browser, the created XML data is displayed as follows:

<NEWcompany>AB&C͐ 2; </NEWcompany>

The problem here is, by default, XMLELEMENT "escape" all "&." However, a user or a DBA has no idea which rows contain data already in an entity reference format, thus, does not know which rows need to escape the characters and which rows do not need to escape. Such lack of flexibility in XML publishing functions creates a big problem for a user or DBA.

In some embodiments of the present invention, a database XML parsing function (e.g., XMLPARSE) and a concatenate function (||) are used to create the final XML data, while testing whether there is a need to escape the XML (in accordance with W3C, "escape" herein is defined as "entity and character references may both be used to escape delimiter, for example, the left angle bracket and ampersand.")

If escape is needed, a XML publishing function (e.g., XMLELEMENT) is applied to create the final XML data. This can prevent the double escape problem mentioned above and a user does not need to know the format of the source in advance.

A method according to some embodiments of the present invention is summarized in the following codes. The detailed description of the method is followed in FIGS. 2 and 3.

```
CREATE PROCEDURE correctXML(IN theID INTEGER, OUT
XMLOUT XML)
DETERMINISTIC
LANGUAGE SQL
DISABLE DEBUG MODE
ISOLATION LEVEL CS
PROC: BEGIN
DECLARE SQLCODE INTEGER;
DECLARE CONTINUE HANDLER FOR SQLEXCEPTION,
SQLWARNING
BEGIN
    -- implementation specific. Need to test for specific error code
    -- in other implementation
    IF SQLCODE= -20398 THEN
         SELECT XMLELEMENT(NAME "NEWcompany",
             company) into XMLOUT
         FROM table1 where id=theID;
      END IF;
END;
SET XMLOUT = NULL;
SELECT XMLPARSE(DOCUMENT
      '<NewCompany>'|| company || '</NewCompany>') into
      XMLOUT
   FROM table1 where id=theID;
END PROC;
```

The above codes are written using SQL PL (procedural language) for DB2 for z/OS, which can also be easily implemented in other programming languages as well. The above SQL PL codes can be further modified (e.g. error handling, etc.). (Note: the term(s) "SQL PL", "DB2" and/or "z/OS" may be subject to trademark rights in various jurisdictions throughout the world and are used here only in reference to the products or services properly denominated by the marks to the extent that such trademark rights may exist.)

Figure 2:
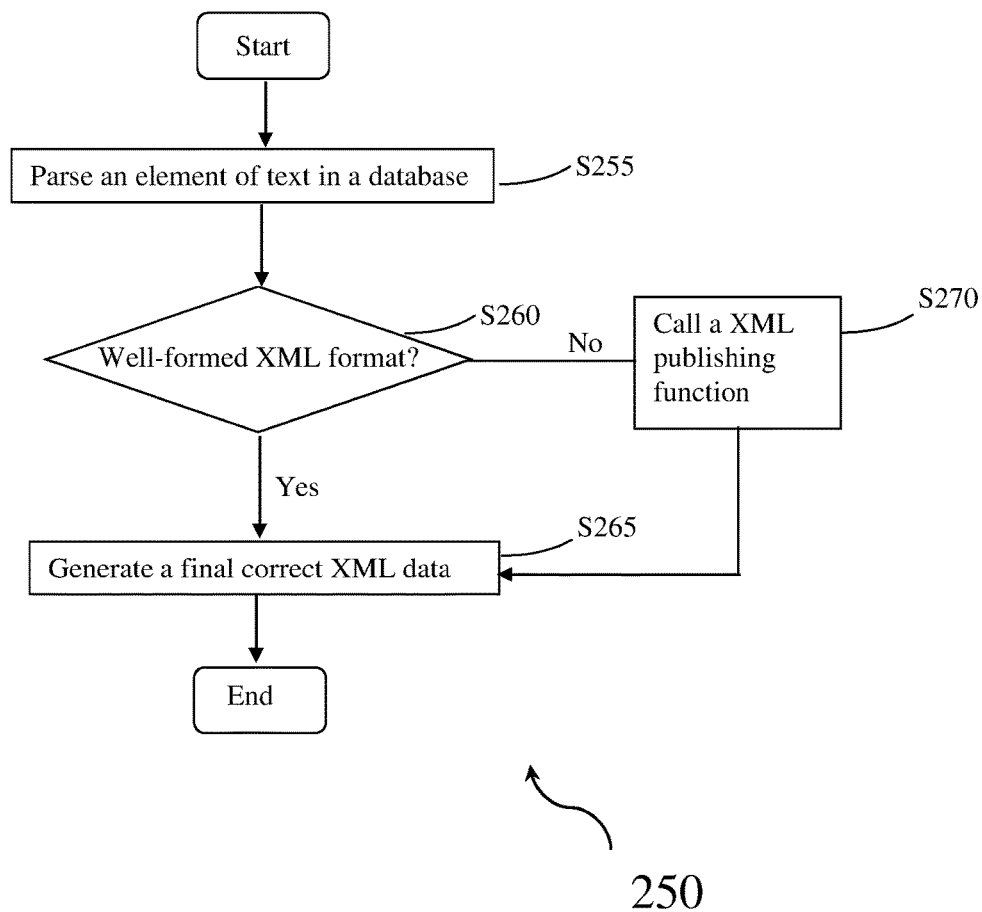
FIG. 2 is a flowchart showing a method performed, at least in part, by the first embodiment system.
Figure 3:
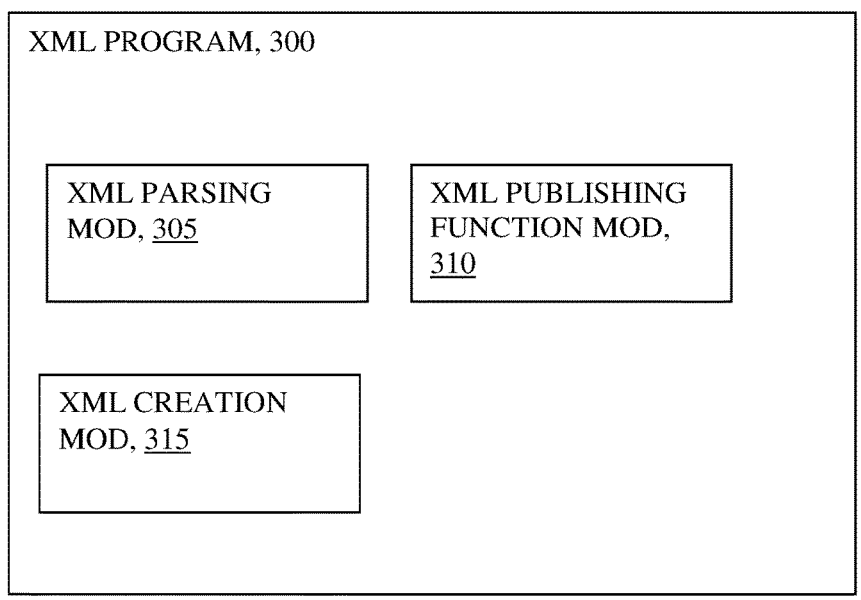
FIG. 3 is a schematic view of a machine logic (for example, software) portion of the first embodiment system.

FIG. 2 shows flowchart 250 depicting a first method as given in the above codes according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing proceeds to step S255 once program 300 begins from START, where XML parsing module 305 uses a database XML parsing function to parse an element of text in a database. In this exemplary embodiment, the parsing function is XMLPARSE in DB2, and the text is a table column having a data type of VARCHAR in a database table in database 111 (FIG. 1). Alternatively, the text is a table column having a data type of CLOB in a database table. The element to be parsed is a row, also referred to herein as a tuple, in the table column. The XMLPARSE function parses an argument as an XML document and returns an XML value, as shown in the above codes:

```
SELECT XMLPARSE(DOCUMENT
    '<NewCompany>'|| company || '</NewCompany>') into XMLOUT
FROM table1 where id=theID;
```

Alternatively, other parsing functions in different database management systems can be used to parse an element of text.

Processing proceeds to step S260, where XML parsing module 305 determines whether the element of text to be parsed is a well-formed XML format. For example, the element in the first row (herein referred to as a first element) in the table created in the codes above, is a well-formed XML text node format "AB&C™", where "&" is replaced with its entity reference "&" and the "TM" is replaced with "™". Whereas the element in the second row (herein referred to as a second element) in the table created in the codes above is not a well-formed XML format "AB&C™" where both "&" and "TM" are their actual values respectively.

If "YES" branch is selected from step S260, processing proceeds to step S265, where XML creation module 315 generates a final XML format data by converting the parsed element and concatenating it. In this example, the text node of the first element "AB&C™" is parsed to be a well-formed XML data, and the final generated XML data is:
    <NEWcompany>AB&C™</Newcompany>
if viewed by a web browser (e.g., IE), the generated XML data is displayed correctly as:
    <NEW company>AB&C™</New company>

If "NO" branch is selected from step S260, processing proceeds to step S270, where XML creation module 315 module calls XML publishing function module 310 to generate a final correct XML data by converting the not-well-formed XML data of the parsed element. In this exemplary embodiment, the second element of text "AB&C™" is parsed to be a not-well-formed XML data, thus, the XML-PARSE function does not run successfully. Inside the continue handler of a DB2 system (DECLARE CONTINUE HANDLER FOR SQLEXCEPTION, SQLWARNING, as shown in the above codes) an error number of −20398 is used to indicate the failure of XMLPARSE function. This error number is specific to the DB2 for z/OS, meaning a non-well-formed error. Alternatively, a different error number can be used in other database management systems.

Once this error number is detected to indicate an entity reference error, a XML publishing function (e.g., XMLELE-MENT) is called to escape the data and create the final correct XML data, as illustrated in the above codes:

```
IF SQLCODE= −20398 THEN
    SELECT XMLELEMENT(NAME "NEWcompany", company)
    into XMLOUT
    FROM table1 where id=theID;
END IF;
```

In this example, the error number of −20398 is tested just for an illustrative purpose. Alternatively, other specific error numbers need to be checked to ensure the error is caused by an entity reference. The final XML data generated for the second element by using the XML publishing function is:
    <NEWcompany>AB&C™</Newcompany>
If viewed by a web browser (e.g., IE), the generated XML data is displayed correctly as:
    <NEW company>AB&C™</New company>

Processing stops at END, as in FIG. 2. If a next element of text needs to be processed, the processing returns to START and starts automatically.

Some embodiments of the present invention may include one, or more, of the following features, characteristics and/or advantages: (i) a user does not need to know anything about the data format (entity reference or not) of the source for creating XML data; (ii) a "double" escape problem can be prevented if the source is already in entity reference format; (iii) a user has a freedom to have not restricted input data to a certain formatting rule and still process it to valid XML later; (iv) conventional XML publishing functions in a relational database system can be improved; and/or (v) conventional database applications that manipulate XML data can be enhanced.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for converting a first character string in a database element to an extensible markup language (XML) format while automatically preventing a double entity reference error, the method comprising:

determining, for the first character string being formatted according to a first format, the presence of only actual values and no character reference within the first character string by parsing, with an XML parsing function, the first character string;

responsive to determining the presence of only actual values and no character reference, automatically calling an XML publishing function, the XML publishing function:

escaping the first character string; and generating a set of XML formatted data by converting the first character string from the first format to the XML format;

replacing the first character string in the database element with the set of XML formatted data;

wherein:

the database element is within a table column;

a type of the table column is a member of the group consisting of:

a) variable character column (VARCHAR); and b) character large object (CLOB); and the first format is an unknown format.

2. The method of claim 1, wherein the XML publishing function is XMLELEMENT.

3. The method of claim 1, further comprising:

publishing the table column for viewing in a web browser.

* * * * *